(12) United States Patent
Shimada et al.

(10) Patent No.: US 9,806,644 B2
(45) Date of Patent: Oct. 31, 2017

(54) CONTROL DEVICE

(71) Applicant: AISIN AW CO., LTD., Anjo-shi, Aichi-ken (JP)

(72) Inventors: Arinori Shimada, Nishio (JP); Mitsuru Takahashi, Hekinan (JP)

(73) Assignee: AISIN AW CO., LTD., Anjo (JP)

( * ) Notice: Subject to any disclaimer, the term of this patent is extended or adjusted under 35 U.S.C. 154(b) by 0 days.

(21) Appl. No.: 14/911,684

(22) PCT Filed: Sep. 18, 2014

(86) PCT No.: PCT/JP2014/074642
§ 371 (c)(1),
(2) Date: Feb. 11, 2016

(87) PCT Pub. No.: WO2015/046000
PCT Pub. Date: Apr. 2, 2015

(65) Prior Publication Data
US 2016/0204720 A1    Jul. 14, 2016

(30) Foreign Application Priority Data
Sep. 24, 2013   (JP) .................................. 2013-197180

(51) Int. Cl.
*H02P 3/12*    (2006.01)
*H02P 3/22*    (2006.01)
(Continued)

(52) U.S. Cl.
CPC ................ *H02P 3/22* (2013.01); *F04B 17/05* (2013.01); *F16H 61/0025* (2013.01);
(Continued)

(58) Field of Classification Search
CPC ......... H02P 3/22; H02P 3/025; F16H 61/0025
(Continued)

(56) References Cited

U.S. PATENT DOCUMENTS 6,163,127 A     12/2000 Patel et al.
2005/0211478 A1*  9/2005 Sakuma .................. B60L 7/003
                                                  180/65.1
(Continued)

FOREIGN PATENT DOCUMENTS

JP    2002-345289 A    11/2002
JP    2008-206343 A     9/2008
JP    2010-221932 A    10/2010

OTHER PUBLICATIONS

Dec. 9, 2014 Search Report issued in International Patent Application No. PCT/JP2014/074642.

*Primary Examiner* — Erick Glass
(74) *Attorney, Agent, or Firm* — Oliff PLC

(57) ABSTRACT

A control device that controls an inverter interposed between a DC power source and an AC rotary electric machine to perform power conversion between DC power and AC power, wherein the inverter includes a plurality of sets of an upper switching element and a lower switching element connected in series with each other between positive and negative electrodes on the DC side and controlled so as to be turned on and off in a complementary manner; and the control device executes short-circuiting processing, in which all the upper switching elements or all the lower switching elements are controlled so as to be turned on, while the AC rotary electric machine is stationary.

9 Claims, 3 Drawing Sheets

(51) Int. Cl.
  *F04B 17/05* (2006.01)
  *F16H 61/00* (2006.01)
  *H02P 6/24* (2006.01)
  *H02P 3/02* (2006.01)
  *H02P 6/18* (2016.01)
(52) U.S. Cl.
  CPC ................ *H02P 3/025* (2013.01); *H02P 6/18* (2013.01); *H02P 6/24* (2013.01)
(58) Field of Classification Search
  USPC ........................................................ 318/379
  See application file for complete search history.

(56) References Cited

U.S. PATENT DOCUMENTS

| | | | |
|---|---|---|---|
| 2008/0252242 A1 | 10/2008 | Akama et al. | |
| 2010/0186404 A1* | 7/2010 | Yasufuku | B60L 7/14 60/459 |
| 2011/0040519 A1* | 2/2011 | Yeh | H02P 6/16 702/145 |
| 2011/0080127 A1 | 4/2011 | Akama et al. | |
| 2011/0262112 A1* | 10/2011 | Tanaka | G01P 3/48 388/811 |
| 2015/0326151 A1* | 11/2015 | Ogawa | H02P 3/22 318/703 |

* cited by examiner

CONTROL DEVICE

BACKGROUND

The present disclosure relates to a control device that controls an inverter interposed between a DC power source and an AC rotary electric machine to perform power conversion between DC power and AC power.

An example of the control device described above is described in U.S. Pat. No. 6,163,127. U.S. Pat. No. 6,163,127 describes a technology for sensorlessly detecting the position (magnetic pole position) of a rotor without using a rotation sensor, the position being required to control drive of an AC rotary electric machine through vector control. In order to improve the efficiency and the accuracy of the system, the control device according to U.S. Pat. No. 6,163,127 is configured to switchably use one of a technique that is suitable to detect the magnetic pole position in a low rotational speed range and a technique that is suitable to detect the magnetic pole position in a high rotational speed range in accordance with the rotational speed of the rotor.

In the configuration in which the magnetic pole position of the rotor of the AC rotary electric machine is sensorlessly detected, in general, the magnetic pole position of the rotor is detected in a state in which the magnetic pole position of the rotor is unknown when the AC rotary electric machine is started from a state in which the AC rotary electric machine is stationary. Therefore, it takes a long time to detect the magnetic pole position compared to a case where a rotation sensor is used, which accordingly increases the time required to start the AC rotary electric machine. In U.S. Pat. No. 6,163,127, however, such an issue is not taken into special consideration.

SUMMARY

In view of the foregoing, it is desirable to provide a control device that is capable of shortening the time required to start an AC rotary electric machine.

The present disclosure according to an exemplary aspect provides a control device that controls an inverter interposed between a DC power source and an AC rotary electric machine to perform power conversion between DC power and AC power, wherein the inverter includes a plurality of sets of an upper switching element and a lower switching element connected in series with each other between positive and negative electrodes on the DC side and controlled so as to be turned on and off in a complementary manner; and the control device executes short-circuiting processing, in which all the upper switching elements or all the lower switching elements are controlled so as to be turned on, while the AC rotary electric machine is stationary.

The term "AC rotary electric machine" as used herein refers to a rotary electric machine driven by AC power. Here, the term "rotary electric machine" refers to a concept that includes any of a motor (electric motor), a generator (electric generator), and a motor generator that functions both as a motor and as a generator as necessary.

According to the exemplary configuration described above, the short-circuiting processing is executed while the AC rotary electric machine is stationary. While the short-circuiting processing is executed, a closed loop circuit is formed by the AC rotary electric machine and the inverter. Therefore, it is possible to establish a state in which both ends of a stator coil of the AC rotary electric machine are short-circuited, that is, torque in the direction opposite to the rotational direction is generated in the rotor of the AC rotary electric machine. Hence, it is possible to suppress variations in stop position of the rotor of the AC rotary electric machine, even in the case where vibration is transmitted to the AC rotary electric machine, for example, by executing the short-circuiting processing while the AC rotary electric machine is stationary. In this event, all the upper switching elements or all the lower switching elements are controlled so as to be turned on in the short-circuiting processing, and there is no need for on/off switching control to be performed on the switching elements. Hence, according to the exemplary configuration described above, it is possible to suppress variations in stop position of the rotor of the AC rotary electric machine while suppressing an energy loss.

Then, it is possible to suppress variations in stop position of the rotor of the AC rotary electric machine in this way, and thus it is possible to shorten the time required to start the AC rotary electric machine. The reason is as follows. In the case where variations in stop position of the rotor of the AC rotary electric machine are suppressed, the stop position of the rotor at a time point before the start of the AC rotary electric machine can be used as the initial position of the rotor at the time when the AC rotary electric machine is to be started as the stop position of the rotor at the time when the AC rotary electric machine is stopped, for example. As a result, there is no need for processing for determining the initial position of the rotor when the AC rotary electric machine is started, which makes it possible to shorten the time required to start the AC rotary electric machine.

Preferably, the short-circuiting processing is executed continuously after a stop position of a rotor of the AC rotary electric machine is detected until rotation of the rotor of the AC rotary electric machine is started.

With the configuration, variations in stop position of the rotor can be suppressed during a period after the stop position of the rotor of the AC rotary electric machine is detected until rotation of the rotor of the AC rotary electric machine is started. Hence, the time required to start the AC rotary electric machine can be shortened appropriately by using the stop position of the rotor detected before execution of the short-circuiting processing as the initial position of the rotor at the time when the AC rotary electric machine is to be started.

Preferably, all the lower switching elements are controlled so as to be turned on in the short-circuiting processing.

With the configuration, the short-circuiting processing can be executed continuously appropriately in the case where there is a constraint on the period for which the upper switching elements can be continuously controlled so as to be turned on. In addition, in a configuration that enables detection of a current that flows through the lower switching element, it is possible to detect whether or not there is occurring an abnormal state such as a state in which an excessively large current flows through the lower switching elements is occurring during execution of the short-circuiting processing.

Preferably, a sensor that includes a member that rotates together with a rotor of the AC rotary electric machine and that detects a rotational position of the rotor of the AC rotary electric machine is not connected to the control device.

In the case where the magnetic pole position of the rotor of the AC rotary electric machine is to be detected sensorlessly, in general, processing for detecting the initial position of the rotor is required, and the start of the AC rotary electric machine is delayed in accordance with the time for the processing. In contrast, with the control device according to the present disclosure, as described above, there is no need for processing for determining the initial position of the rotor when the AC rotary electric machine is to be started, which makes it possible to shorten the time required to start the AC rotary electric machine. Hence, the control device is particularly suitable for a configuration in which a sensor that includes a member that rotates together with the rotor of the AC rotary electric machine and that detects the rotational position of the rotor of the AC rotary electric machine is not connected to the control device.

Preferably, the AC rotary electric machine is a drive rotary electric machine for a hydraulic pump that generates a control hydraulic pressure for a vehicle drive transmission device.

In the case where the AC rotary electric machine is a drive rotary electric machine for a hydraulic pump that generates a control hydraulic pressure for a vehicle drive transmission device as in the configuration, the stop position of the rotor of the AC rotary electric machine may be varied because of vibration of the vehicle after rotation of the AC rotary electric machine is stopped. In this respect, with the control device according to the present disclosure, as described above, it is possible to suppress variations in stop position of the rotor of the AC rotary electric machine, even in the case where vibration is transmitted to the AC rotary electric machine, by executing the short-circuiting processing while the AC rotary electric machine is stationary. As a result, the time required to start the AC rotary electric machine can be shortened. Hence, in the case where the AC rotary electric machine is a drive rotary electric machine for a hydraulic pump that generates a control hydraulic pressure for a vehicle drive transmission device, it is possible to generate a necessary hydraulic pressure by immediately driving the hydraulic pump when the AC rotary electric machine which has been stationary is driven to generate a control hydraulic pressure for the vehicle drive device, and to appropriately secure the response of the vehicle drive transmission device.

DETAILED DESCRIPTION OF EMBODIMENTS

Figure 1:
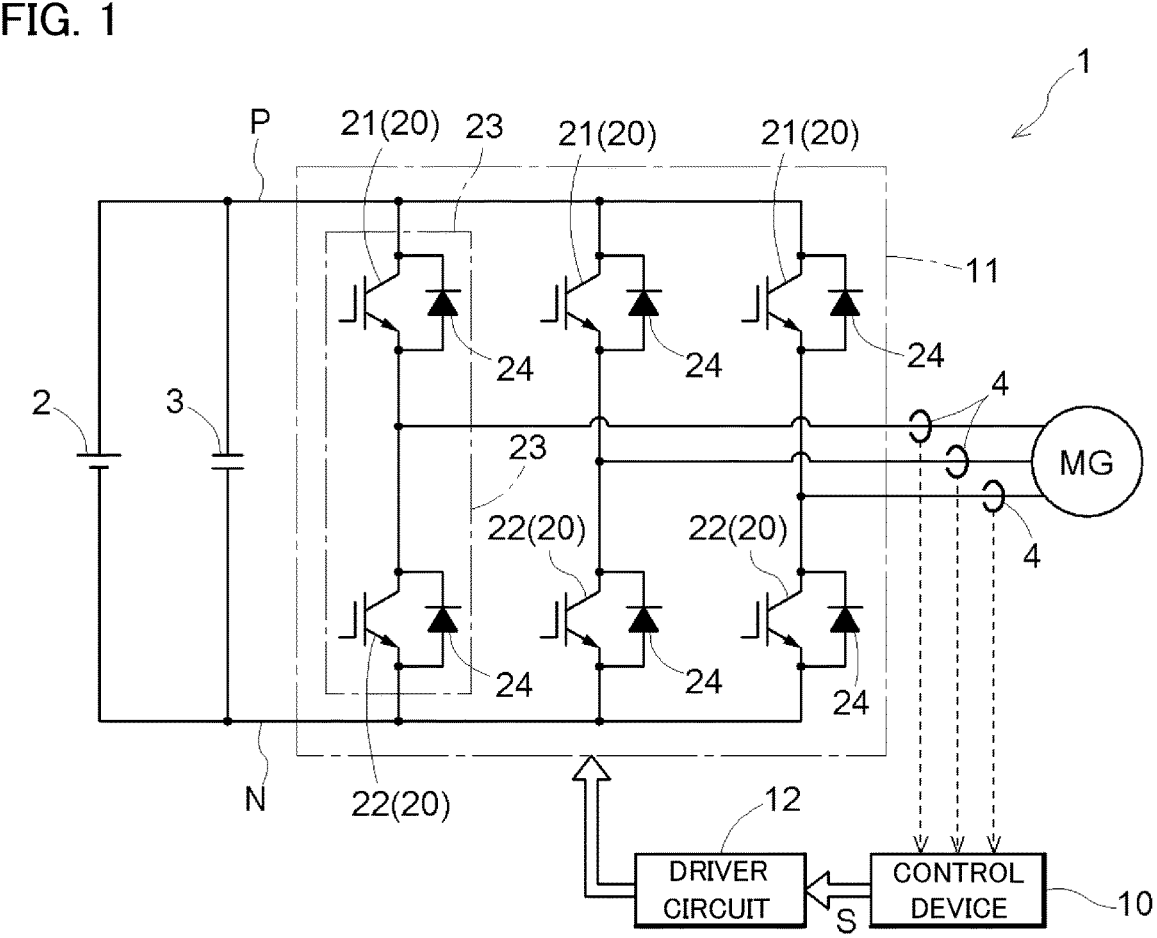
FIG. 1 is a diagram schematically illustrating the configuration of a rotary electric machine drive device according to an embodiment of the present disclosure.

A control device according to an embodiment of the present disclosure will be described with reference to the drawings. As illustrated in FIG. 1, a control device 10 according to the embodiment is provided in a rotary electric machine drive device 1 that controls drive of an AC-driven rotary electric machine MG. The control device 10 is a device that controls an inverter 11 provided in the rotary electric machine drive device 1, and controls drive of the rotary electric machine MG via the inverter 11. In the embodiment, the rotary electric machine MG is an interior permanent magnet synchronous motor (IPMSM), and has saliency (including inverse saliency), that is, the magnetic properties in the direction of the N pole of a permanent magnet of a rotor are different from the magnetic properties in a direction that is electrically perpendicular thereto (direction that is shifted in electrical angle by 90 degrees therefrom). In the embodiment, the rotary electric machine MG corresponds to the "AC rotary electric machine" according to the present disclosure. In the following description, the rotor of the rotary electric machine MG will be occasionally referred to simply as a "rotor".

1. Overall Configuration of Rotary Electric Machine Drive Device

As illustrated in FIG. 1, the rotary electric machine drive device 1 includes the control device 10, the inverter 11, a DC power source 2, and a smoothing capacitor 3. In the embodiment, the rotary electric machine drive device 1 further includes a driver circuit 12 and current sensors 4 that detect currents that flow through the stator coils of the rotary electric machine MG for respective phases. The control device 10 performs current feedback control on the rotary electric machine MG using the current detected by the current sensor 4. The configuration of the control device 10 will be described in detail later in "2. Configuration of Control Device".

The inverter 11 is interposed between the DC power source 2 and the rotary electric machine MG to perform power conversion between DC power and AC power. The inverter 11 is subjected to switching control performed in accordance with a control signal S (switching control signal) generated by the control device 10 to convert power between DC power and AC power. When the rotary electric machine MG functions as a motor, the inverter 11 converts DC power from the DC power source 2 into AC power to supply the AC power to the rotary electric machine MG. When the rotary electric machine MG functions as a generator, the inverter 11 converts AC power generated by the rotary electric machine MG into DC power to supply the DC power to the DC power source 2. The DC power source 2 is constituted of a secondary battery (such as a battery), an electric double layer capacitor, or the like, for example. The smoothing capacitor 3 which smoothes a DC voltage is provided between the inverter 11 and the DC power source 2.

The inverter 11 includes a plurality of switching elements 20. Specifically, the inverter 11 includes a plurality of sets of an upper switching element 21 and a lower switching element 22 connected in series with each other between positive and negative electrodes on the DC side and controlled so as to be turned on and off in a complementary manner. That is, one arm 23 is composed of the upper switching element 21 which is connected to a positive power source line P which is a power source line on the positive electrode side of the DC power source 2, and the lower switching element 22 which is connected to a negative power source line N which is a power source line on the negative electrode side of the DC power source 2, the upper switching element 21 and the lower switching element 22 being connected in series with each other. The inverter 11 includes a number of arms 23, the number being the same as the number of phases of AC power for driving the rotary electric machine MG. The inverter 11 is configured to include a bridge circuit in which the plurality of arms 23 are connected in parallel with each other. In the embodiment, the rotary electric machine MG is a rotary electric machine that operates on three-phase AC, and the inverter 11 includes three arms 23. That is, a bridge circuit in which one arm 23 corresponds to each of stator coils corresponding to U-phase, V-phase, and W-phase of the rotary electric machine MG is constituted.

The upper switching element 21 and the lower switching element 22 which compose one arm 23 are controlled so as to be turned on in a complementary manner. That is, when the upper switching element 21 and the lower switching element 22 which compose one arm 23 are simply stated without taking a dead-time period into consideration, the lower switching element 22 is controlled so as to be turned off for a period for which the upper switching element 21 is controlled so as to be turned on, and the lower switching element 22 is controlled so as to be turned on for a period for which the upper switching element 21 is controlled so as to be turned off.

The collector terminal of the upper switching element 21 is connected to the positive power source line P. The emitter terminal of the upper switching element 21 is connected to the collector terminal of the lower switching element 22. The emitter terminal of the lower switching element 22 is connected to the negative power source line N. The connection point (intermediate point of the arm 23) between the upper switching element 21 and the lower switching element 22 which compose one arm 23 is connected to the corresponding stator coil of the rotary electric machine MG. A freewheel diode 24 is connected in parallel with each of the switching elements 20. The freewheel diode 24 is connected in parallel with each of the switching elements 20 with its cathode terminal connected to the collector terminal of the switching element 20 and with its anode terminal connected to the emitter terminal of the switching element 20.

A set of two switching elements connected in parallel with each other may be used in place of each of the switching elements 20 in the example of FIG. 1. In this case, a set of two upper switching elements 21 connected in parallel with each other and a set of two lower switching elements 22 connected in parallel with each other are connected in series with each other to compose one arm 23. In the example illustrated in FIG. 1, in addition, insulated gate bipolar transistors (IGBTs) are used as the switching elements 20. However, metal oxide semiconductor field effect transistors (MOSFETs) or the like may also be used as the switching elements 20. Furthermore, in the example illustrated in FIG. 1, currents for all the three phases are detected by the current sensors 4. However, only currents for two phases, of the three phases, may be detected, and a current for the remaining one phase may be derived through computation, utilizing the fact that the sum of instantaneous values of the currents for the respective phases is zero.

2. Configuration of Control Device

The control device 10 generates the control signal S for the switching elements 20 to perform switching control on the inverter 11. The control device 10 is configured to include an electronic control unit (ECU) constituted of a logic circuit such as a microcomputer as its core member. In the embodiment, the control device 10 controls drive of the rotary electric machine MG via the inverter 11 by performing current feedback control using a vector control method. The ECU of the control device 10 is configured to include a variety of functional sections for current feedback control, which are each implemented through cooperation between hardware such as a microcomputer and software (program).

In the embodiment, the control device 10 is connected to the inverter 11 via the driver circuit 12. The driver circuit 12 is a circuit that relays the control signal S generated by the control device 10 to a control terminal (such as a gate terminal or a base terminal) of the switching elements 20. The driver circuit 12 includes a voltage conversion circuit, an insulation circuit, and so forth, for example, and imparts a drive capability for driving the switching elements 20 to the control signal S generated by the control device 10 by increasing the voltage amplitude, supplying an input/output current, or the like. In the embodiment, although not described in detail, a floating power source that utilizes a transformer is applied as the power source for the driver circuit 12.

In the embodiment, a sensor (hereinafter referred to as a "rotation sensor") that includes a member that rotates together with the rotor of the rotary electric machine MG and that detects the rotational position of the rotor of the rotary electric machine MG is not connected to the control device 10. The rotational position of the rotor is the rotational angle in terms of electrical angle (that is, the magnetic pole position). The rotation sensor is a sensor that directly detects the rotational position of the rotor of the rotary electric machine MG. Examples of the rotation sensor include a resolver, a sensor that uses a magnetoresistive element (MR element), a sensor that uses a Hall element, and so forth. The resolver includes a sensor rotor as the member that rotates together with the rotor of the rotary electric machine MG. The sensor that uses a magnetoresistive element includes a rotary member provided with external teeth, for example, as the member that rotates together with the rotor of the rotary electric machine MG, and detects the magnetic pole position of the rotor on the basis of the presence or absence of the teeth. The sensor that uses a Hall element detects the magnetic pole position of the rotor by detecting magnetic flux generated by the permanent magnet of the rotor of the rotary electric machine MG. In this case, the member that rotates together with the rotor of the rotary electric machine MG is the rotor itself. In general, the sensor that uses a magnetoresistive element and the sensor that uses a Hall sensor have a low resolution compared to the resolver.

In the embodiment, in this way, a rotation sensor is not connected to the control device 10. That is, in the embodiment, the rotary electric machine MG is not provided with a rotation sensor. Therefore, in the embodiment, the control device 10 performs sensorless magnetic pole detection processing in which the magnetic pole position of the rotor is electrically detected on the basis of an electrical phenomenon that matches the magnetic pole position of the rotor. That is, in the embodiment, the control device 10 has a function of sensorlessly detecting the rotational state (the magnetic pole position, the rotational speed, and the magnetic pole direction) of the rotary electric machine MG without using a rotation sensor.

Vector control performed by the control device 10 according to the embodiment will be briefly described below. In the vector control, the coordinate system (vector space) is a d-q-axis vector coordinate system (d-q-axis vector space) prescribed by a d-axis, which extends in the direction of a magnetic field generated by the permanent magnet disposed in the rotor of the rotary electric machine MG, and a q-axis, which is electrically orthogonal to the d-axis. The control device 10 derives target torque on the basis of a speed command from an ECU or the like, which is superior, and the actual rotational speed of the rotary electric machine MG. In the embodiment, as described above, the rotational state of the rotary electric machine MG is sensorlessly detected, and therefore the actual rotational speed of the rotary electric machine MG is an estimated rotational speed estimated by the control device 10. The control device 10 derives a current command in the d-q-axis vector coordinate system on the basis of the derived target torque.

The control device 10 performs proportional-integral control (PI control) or proportional-integral-derivative control (PID control), for example, on the basis of the deviation between the current command in the d-q-axis vector coordinate system and a feedback current to derive a voltage command in the d-q-axis vector coordinate system. The feedback current is a current in the d-q-axis vector coordinate system derived by performing three-phase/two-phase conversion on detected values of currents that flow through the stator coils of the rotary electric machine MG for the respective phases on the basis of the magnetic pole position of the rotor. The control device 10 performs two-phase/three-phase conversion on the derived voltage command to derive voltage commands for three phases. Then, the control device 10 generates the control signal S for switching control for the inverter 11 on the basis of the derived voltage commands for three phases through pulse width modulation (PWM) control, for example.

In the vector control, as described above, coordinate conversion between the actual three-phase space and the two-phase d-q-axis vector space is required, and the coordinate conversion is performed using the magnetic pole position of the rotor. Therefore, in order to appropriately execute vector control, it is necessary to accurately detect the magnetic pole position of the rotor. In the embodiment, the control device 10 is provided with a function of sensorlessly detecting the magnetic pole position of the rotor of the rotary electric machine MG on the basis of two different techniques (a first detection technique and a second detection technique to be discussed later). Detection of the magnetic pole position of the rotor is executed repeatedly in cycles determined in advance during drive control for the rotary electric machine MG.

The first detection technique is a method that utilizes an induced electromotive force produced by rotation of the rotor of the rotary electric machine MG. Specifically, in the first detection technique, a pulsating component due to the induced electromotive force contained in the feedback current described above is detected to acquire the rotational speed and the magnetic pole position of the rotor through computation. The second detection technique is a method that utilizes the saliency of the rotor of the rotary electric machine MG. Specifically, in the second detection technique, a high-frequency observation signal (observation current or observation voltage) that serves as an electrical stimulus is applied to the rotary electric machine MG, and the magnetic pole position of the rotor is acquired through computation on the basis of a response from the rotary electric machine MG. In the case where the observation signal is a high-frequency voltage signal, the observation signal is superimposed on the voltage command in the d-q-axis vector coordinate system. In this event, the observation signal is superimposed on only a d-axis voltage command, or superimposed on each of a d-axis voltage command and a q-axis voltage command, for example. The first detection technique and the second detection technique are known in the art, and will not be described further.

With the first detection technique, an induced electromotive force is not produced or only a small induced electromotive force is produced in the case where the rotor is stationary or in the case where the rotor is rotating at a very low speed, and thus the magnetic pole position cannot be accurately detected. Therefore, the control device 10 is configured to detect the magnetic pole position using the second detection technique in the case where the rotational speed of the rotor falls within a low rotational speed range which is set to include zero, and to detect the magnetic pole position using the first detection technique in the case where the rotational speed of the rotor falls within a high rotational speed range which is set on the higher side than the low rotational speed range. Hence, when a drive command for the rotary electric machine MG is input from an ECU or the like, which is superior, while the rotary electric machine MG is stationary, for example, the control device 10 starts drive control (sensorless drive control) for the rotary electric machine MG on the basis of the magnetic pole position of the rotor detected by the second detection technique.

When the magnetic pole position of the rotor is to be detected on the basis of the second detection technique in a state in which the magnetic pole position of the rotor is unknown, the initial value (initial position) for the second detection technique is selected from the range of 360 degrees, and therefore it takes some time to detect the magnetic pole position (specifically, to converge the detected magnetic pole position). With the second detection technique, in addition, the polarity of the magnetic pole (whether the magnetic pole belongs to the N pole or the S pole) is not specified, and therefore it also takes time to determine the polarity of the detected magnetic pole position (N/S determination) after the magnetic pole position with unknown polarity is detected. Therefore, in order to shorten the time after a drive command for the rotary electric machine MG is input until sensorless drive control for the rotary electric machine MG is started, it is preferable that the magnetic pole position of the rotor with the rotary electric machine MG stationary should be detected, and that the detected magnetic pole position should be used as the initial value for the second detection technique when sensorless drive control is started. In N/S determination, although not described in detail, an observation signal containing a DC bias component in addition to a high-frequency component is applied to the rotary electric machine MG, and the polarity of the magnetic pole is determined on the basis of a response from the rotary electric machine MG, for example.

Thus, it is conceivable that the control device 10 stores the magnetic pole position (a value detected by the second detection technique) of the rotor at the time when rotation of the rotary electric machine MG (rotation of the rotor) is stopped to specify the magnetic pole position of the rotor with the rotary electric machine MG stationary. With such a configuration, however, sensorless drive control may not be performed appropriately in the case where the rotor is rotationally moved by vibration of the rotary electric machine drive device 1 or the like after rotation of the rotary electric machine MG is stopped.

In order to address such rotational movement of the rotor due to vibration of the rotary electric machine drive device 1 or the like, it is also conceivable to repeatedly execute detection of the magnetic pole position by the second detection technique while the rotary electric machine MG is stationary. However, this involves the need to repeatedly apply an observation signal to the rotary electric machine MG, which may increase an energy loss. In addition, generation of noise from the inverter 11 or the rotary electric machine MG may be problematic.

In view of the foregoing issue, the control device 10 according to the embodiment executes short-circuiting processing, in which all the upper switching elements 21 or all the lower switching elements 22 are controlled so as to be turned on, while the rotary electric machine MG is stationary. Consequently, the rotor of the rotary electric machine MG can be fixed in position while the rotary electric machine MG is stationary as discussed below. The phrase "while the rotary electric machine MG is stationary" means a state in which the rotary electric machine MG is stationary after the rotor of the rotary electric machine MG which has been rotating is stopped". The upper switching element 21 and the lower switching element 22 which compose one arm 23 are controlled so as to be turned on in a complementary manner. Therefore, when all the upper switching elements 21 are controlled so as to be turned on, all the lower switching elements 22 are controlled so as to be turned off. When all the lower switching elements 22 are controlled so as to be turned on, meanwhile, all the upper switching elements 21 are controlled so as to be turned off.

When the short-circuiting processing is executed, as is clear from FIG. 1, all the upper switching elements 21 are conducted, or all the lower switching elements 22 are conducted. Therefore, a closed loop circuit is formed by the rotary electric machine MG and the inverter 11. That is, both ends of the stator coils of the rotary electric machine MG for the plurality of phases are short-circuited (active short-circuit state). During execution of the short-circuiting processing, as discussed below, torque in the direction opposite to the rotational direction is applied to the rotor of the rotary electric machine MG, and therefore rotation of the rotor of the rotary electric machine MG is restricted. During execution of the short-circuiting processing, switching control for the inverter 11 (on/off switching control for the switching elements 20) is not executed. Therefore, an energy loss can be suppressed compared to a case where detection of the magnetic pole position by the second detection technique is repeatedly executed while the rotary electric machine MG is stationary and a case where the inverter 11 is subjected to switching control to make the rotor stationary in position.

A common circuit equation in the rotating coordinate system (d-q-axis vector coordinate system) of a rotary electric machine having magnetic saliency is represented by the following expression (1). In the expression, Vd indicates the d-axis voltage, Vq indicates the q-axis voltage, Id indicates the d-axis current, Iq indicates the q-axis current, R indicates the resistance of the stator coil, p indicates a differential operator, Ld indicates the d-axis inductance, Lq indicates the q-axis inductance, ω indicates the rotational frequency (angular speed), and M indicates an induced voltage constant.

[Expression 1]

$$\begin{bmatrix} Vd \\ Vq \end{bmatrix} = \begin{bmatrix} R+pLd & -\omega Lq \\ \omega Ld & R+pLq \end{bmatrix} \begin{bmatrix} Id \\ Iq \end{bmatrix} + \begin{bmatrix} 0 \\ \omega M \end{bmatrix} \quad (1)$$

During execution of the short-circuiting processing, Vd=Vq=0 is met, and the differential term can be ignored because of the steady state. Then, Id and Iq are represented by the following expression (2).

[Expression 2]

$$Id = \frac{-\omega^2 LqM}{R^2 + \omega^2 LdLq}, \quad Iq = \frac{-\omega MR}{R^2 + \omega^2 LdLq} \quad (2)$$

In addition, the relationship between torque T of the rotary electric machine and the d-axis current Id and the q-axis current Iq is represented by the following expression (3). In the expression, P is the number of pole pairs of the rotary electric machine.

[Expression 3]

$$T=PMIq+P(Ld-Lq)IdIq \quad (3)$$

In the embodiment, the rotary electric machine MG has inverse saliency with Ld<Lq. In addition, R>0, P>0, and M>0 are met. In the case where ω>0 is met, Id<0 and Iq<0 are derived from the expression (2), and T<0 is derived from the expression (3). In the case where ω<0 is met, meanwhile, Id<0 and Iq>0 are derived from the expression (2), and T>0 is derived from the expression (3). That is, torque (counter torque) in the direction opposite to the rotational direction is generated in the rotor of the rotary electric machine MG irrespective of whether the rotational direction is forward or in reverse. Consequently, rotation of the rotor of the rotary electric machine MG is restricted during execution of the short-circuiting processing, as a result of which it is possible to make the rotor stationary in position while the rotary electric machine MG is stationary.

In the embodiment, the control device 10 is configured to execute the short-circuiting processing continuously after the stop position of the rotor of the rotary electric machine MG is detected until rotation of the rotor of the rotary electric machine MG is started. That is, the control device 10 executes the short-circuiting processing continuously after the stop position of the rotor of the rotary electric machine MG is detected until rotation of the rotor of the rotary electric machine MG is started. In the embodiment, the control device 10 detects the stop position (magnetic pole position) of the rotor using the second detection technique and N/S determination on condition that the main power of the control device 10 is turned on. Then, the control device 10 stores the detected magnetic pole position in a storage section (not illustrated), and starts execution of the short-circuiting processing. The main power of the control device 10 is turned on by switching on the main power of the rotary electric machine drive device 1 or a device (e.g. a vehicle) provided with the rotary electric machine drive device 1, for example.

In the embodiment, in addition, the control device 10 detects the stop position (magnetic pole position) of the rotor of the rotary electric machine MG at the time when rotation of the rotor of the rotary electric machine MG is stopped from a state in which the rotor is rotating by the second detection technique, stores the detected magnetic pole position in the storage section, and starts execution of the short-circuiting processing. In the case where detection of the magnetic pole position by the second detection technique is repeatedly executed until the rotor is stopped, the magnetic pole position of the rotor last detected may be stored in the storage section as the stop position of the rotor. Detection of the stop position of the rotor of the rotary electric machine MG can also be performed at a time point after the time point when the main power of the control device 10 is turned on or at a time point after the time point when rotation of the rotor is stopped.

The control device 10 executes the short-circuiting processing continuously until rotation of the rotor of the rotary electric machine MG is started, that is, continuously until a drive command for the rotary electric machine MG (e.g. a command value for the rotational speed or torque) is input from an ECU or the like which is superior. Then, when a drive command for the rotary electric machine MG is input, the control device 10 ends the short-circuiting processing, and starts detection of the magnetic pole position of the rotor by the second detection technique using the stored magnetic pole position as the initial value to start sensorless drive control for the rotary electric machine MG. As a matter of course, conditions for ending the short-circuiting processing can additionally include a condition other than input of a drive command for the rotary electric machine MG. For example, in order to suppress an energy loss or the like due to execution of the short-circuiting processing over a relatively long period, the short-circuiting processing can be ended in the case where a time determined in advance has elapsed after execution of the short-circuiting processing is started.

With the control device 10 according to the present disclosure, as described above, it is possible to shorten the time after a drive command for the rotary electric machine MG is input until sensorless drive control for the rotary electric machine MG is started. Consequently, the following advantages are obtained in the case where the rotary electric machine MG is configured to drive the rotor (pump rotor) of an electric oil pump provided in the vehicle and oil discharged from the electric oil pump is supplied to a servo mechanism (e.g. a servo mechanism for a hydraulically driven engagement device) for a drive force transmission mechanism that transmits a drive force between wheels and a drive force source for the wheels, for example. That is, the electric oil pump can be immediately driven to generate a necessary hydraulic pressure in the case where it is necessary to drive the electric oil pump to supply oil to the servo mechanism. Consequently, it is possible to suppress a reduction in response of the drive force transmission mechanism (vehicle drive device) due to a shortage of an engagement pressure for the engagement device or the like. In the case where a parking lock mechanism that locks the wheels while the vehicle is stationary is configured to be unlocked upon receiving supply of oil discharged from the electric oil pump, in addition, it is also possible to suppress excessive extension of the time required to unlock the parking lock mechanism.

Furthermore, in the case where the rotary electric machine MG is provided in the vehicle as the drive force source for the wheels, for example, highly responsive starting control can be achieved when the vehicle is started using the drive force of the rotary electric machine MG. The rotary electric machine MG may be configured to drive a rotary body other than the pump rotor provided independently of the wheels such as a rotor of a water pump or a rotor of a compressor of an air conditioner, for example. As a matter of course, the rotary electric machine MG can also be provided in a device other than a vehicle.

Figure 2:
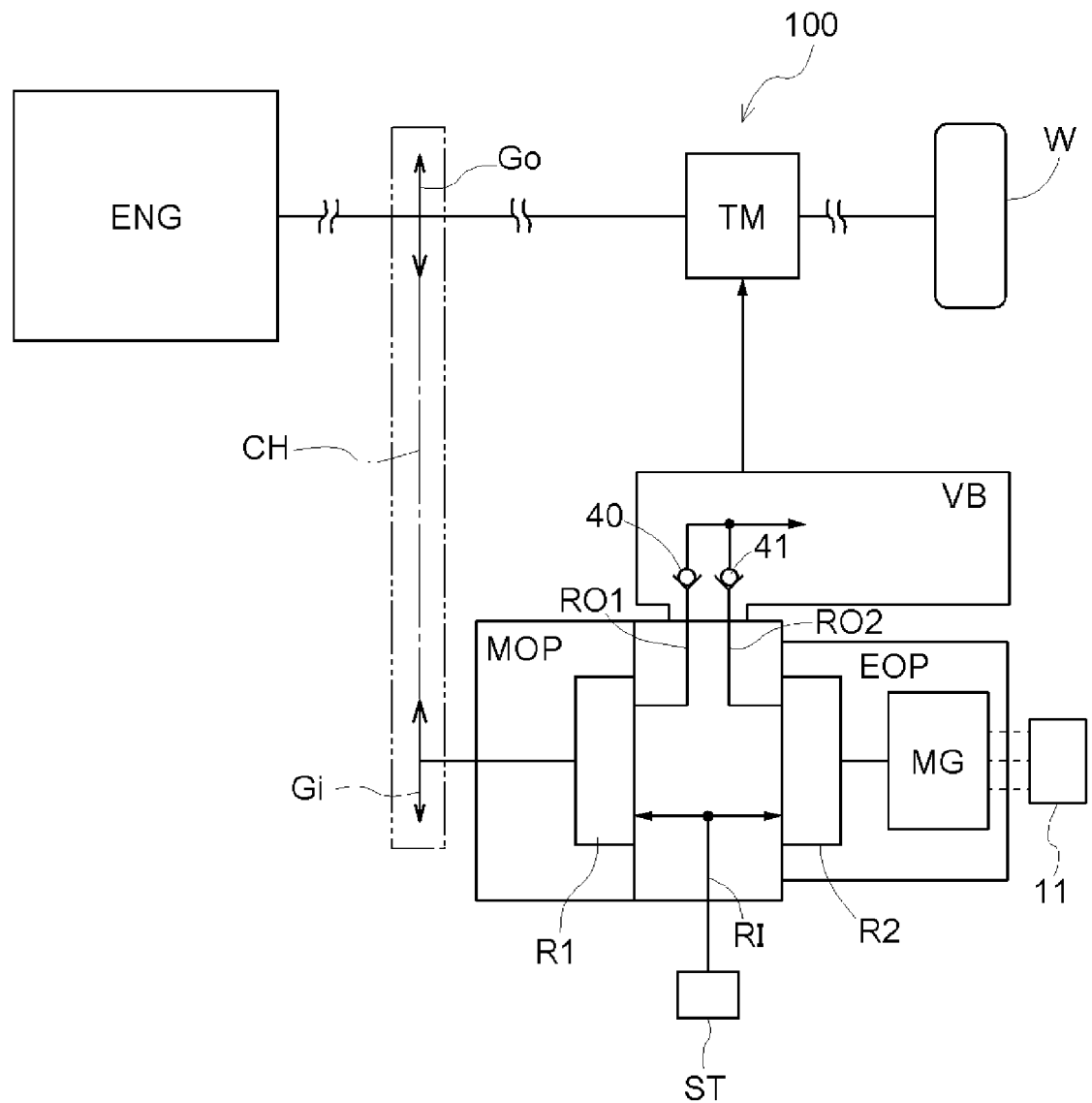
FIG. 2 is a diagram illustrating an example of a rotary electric machine to be controlled by the rotary electric machine drive device.

A specific example of a configuration in which the rotary electric machine MG drives a rotor of an electric oil pump provided in a vehicle to generate a hydraulic pressure required for a drive force transmission mechanism will be described with reference to FIG. 2. As illustrated in FIG. 2, the rotary electric machine MG is configured as a drive rotary electric machine for an electric oil pump EOP that generates a control hydraulic pressure for a vehicle drive transmission device 100. Specifically, the rotary electric machine MG is configured to drive the rotor (second rotor R2) of the electric oil pump EOP. A suction oil passage RI connected to an oil accumulating portion (such as an oil pan, for example) via a strainer ST and a second discharge oil passage RO2 which is a flow path for oil discharged from the electric oil pump EOP are connected to the electric oil pump EOP. The electric oil pump EOP discharges oil suctioned via the suction oil passage RI to the second discharge oil passage RO2 with the second rotor R2 rotated by the drive force of the rotary electric machine MG. Oil discharged to the second discharge oil passage RO2 is controlled by a hydraulic control device VB so as to be supplied to the vehicle drive transmission device 100. The hydraulic control device VB includes a hydraulic circuit composed of oil passages and hydraulic control valves, controls a hydraulic pressure supplied from the electric oil pump EOP, and in the example further controls a hydraulic pressure supplied from a mechanical oil pump MOP to be discussed later. In the embodiment, the electric oil pump EOP corresponds to the "hydraulic pump" according to the present disclosure.

In the example illustrated in FIG. 2, the vehicle drive transmission device 100 is drivingly connected to an internal combustion engine ENG that serves as a drive force source for wheels W, and configured to transmit a rotational drive force of the internal combustion engine ENG to the wheels W with the speed of the rotational drive force changed by a speed change device TM. The internal combustion engine ENG is a motor (such as a gasoline engine and a diesel engine, for example) driven by combusting fuel inside the engine to take out power. The speed change device TM transmits rotation transmitted from the drive force source (in the example, the internal combustion engine ENG) for the wheels W to the wheels W with the speed of the rotation changed with a current speed ratio. The speed change device TM includes a plurality of hydraulically driven engagement devices. The state of engagement of each of the plurality of engagement devices is controlled by the hydraulic control device VB so as to switch between a plurality of shift speeds. A rotary electric machine may be provided as a drive force source for the wheels W in addition to the internal combustion engine ENG, or a rotary electric machine may be provided as a drive force source for the wheels W with no internal combustion engine ENG provided.

In the example illustrated in FIG. 2, the mechanical oil pump MOP is provided as an oil pump that generates a control hydraulic pressure for the vehicle drive transmission device 100 in addition to the electric oil pump EOP. While the electric oil pump EOP is a hydraulic pump driven by the rotary electric machine MG which is a dedicated drive force source (a drive force source provided exclusively for hydraulic control), the mechanical oil pump MOP is a hydraulic pump driven by the drive force source (in the example, the internal combustion engine ENG) for the wheels W. In the example, an input gear Gi connected to the rotor (first rotor R1) of the mechanical oil pump MOP is connected to a drive gear Go provided in a power transmission path between the internal combustion engine ENG and the wheels W via a chain CH. The suction oil passage RI, which is connected to the oil accumulating portion via the strainer ST, and a first discharge oil passage RO1, which is a flow path for oil discharged from the mechanical oil pump MOP, are connected to the mechanical oil pump MOP. The mechanical oil pump MOP discharges oil suctioned via the suction oil passage RI to the first discharge oil passage RO1 with the first rotor R1 rotated by the drive force of the internal combustion engine ENG. Oil discharged to the first discharge oil passage RO1 is controlled by the hydraulic control device VB so as to be supplied to the vehicle drive transmission device 100. In the example, respective upstream portions of the suction oil passage RI, which is connected to the mechanical oil pump MOP, and the suction oil passage RI, which is connected to the electric oil pump EOP, are formed integrally with each other.

In the example illustrated in FIG. 2, respective downstream portions of the first discharge oil passage RO1 and the second discharge oil passage RO2 are formed integrally with each other. Specifically, the first discharge oil passage RO1 and the second discharge oil passage RO2 are merged with each other inside the hydraulic control device VB to form a merged discharge oil passage. A portion of the first discharge oil passage RO1 located upstream of the merged portion with the second discharge oil passage RO2 is provided with a first check valve 40 that restricts a flow of oil toward the upstream side. A portion of the second discharge oil passage RO2 located upstream of the merged portion with the first discharge oil passage RO1 is provided with a second check valve 41 that restricts a flow of oil toward the upstream side. Hence, oil discharged at a higher discharge pressure, among oil discharged from the mechanical oil pump MOP and oil discharged from the electric oil pump EOP, is supplied to the merged discharge oil passage. That is, when only one of the mechanical oil pump MOP and the electric oil pump EOP is driven, oil discharged from the driven oil pump is controlled by the hydraulic control device VB so as to be supplied to the vehicle drive transmission device 100 (speed change device TM). When both the mechanical oil pump MOP and the electric oil pump EOP are driven, oil discharged at a higher discharge pressure is controlled by the hydraulic control device VB so as to be supplied to the vehicle drive transmission device 100 (speed change device TM).

3. Other Embodiments

Lastly, other embodiments of the present disclosure will be described. A configuration disclosed in each of the following embodiments may be applied in combination with a configuration disclosed in any other embodiment unless any contradiction occurs.

Figure 3:
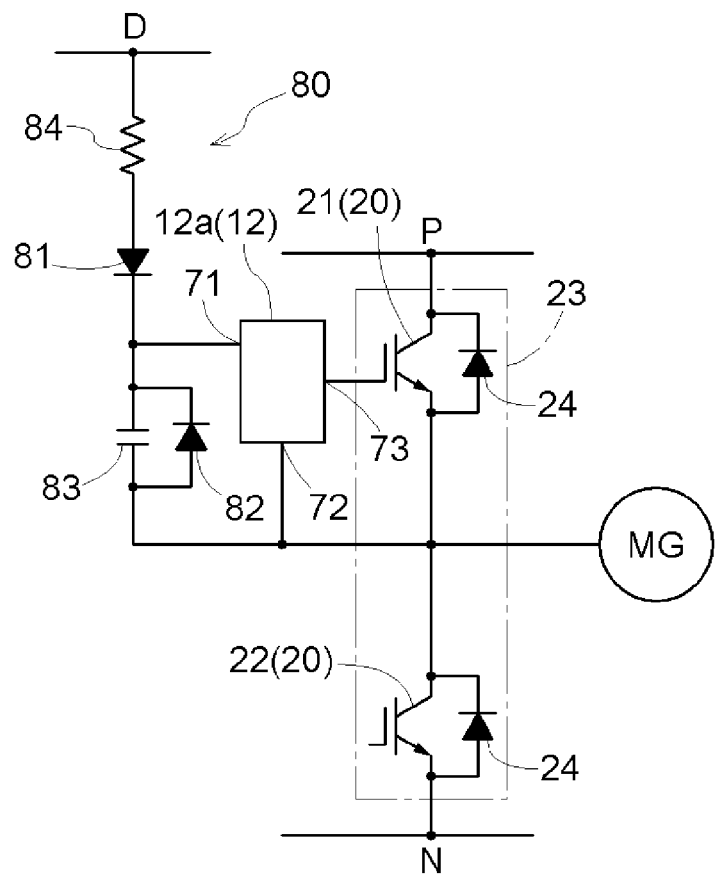
FIG. 3 is a diagram illustrating a part of an inverter according to another embodiment of the present disclosure.

(1) In the embodiment described above, a floating power source circuit that utilizes a transformer is applied as the power source for the driver circuit 12. However, embodiments of the present disclosure are not limited thereto. For example, as illustrated in FIG. 3, a bootstrap power source 80 that uses a bootstrap circuit may also be applied as the power source for the driver circuit 12. In FIG. 3, a reference power line D has a voltage that is higher than the operating voltage (e.g. 5 [V] or 3.3 [V]) of the control device 10, and has a voltage of 15 [V] with reference to a negative power source line N, for example. In FIG. 3, for simplification, only the arm 23 corresponding to one phase is illustrated. However, the arms 23 for the other phases are also configured in the same manner. In FIG. 3, in addition, only an upper driver circuit 12a that drives the upper switching element 21, of the driver circuit 12, is illustrated.

As illustrated in FIG. 3, the upper driver circuit 12a operates on the bootstrap power source 80 with its negative electrode at a potential on the negative electrode side (a potential on the emitter terminal side) of the upper switching element 21 and with its positive electrode at a potential raised with respect to the negative electrode by a voltage prescribed in advance. Specifically, the bootstrap power source 80 includes a first diode 81 and a resistor 84 connected in series with each other, and a capacitor 83 and a second diode 82 connected in parallel with each other. A first terminal 71 of the upper driver circuit 12a is connected to the reference power line D via the first diode 81 and the resistor 84. The first diode 81 is provided with its forward direction corresponding to the direction from the reference power line D toward the first terminal 71. Hence, the first terminal 71 is applied with a voltage that is lower than the voltage of the reference power line D by the forward voltage (e.g. 0.6 to 0.7 [V]) of the first diode 81. In addition, a second terminal 72 of the upper driver circuit 12a is connected to the negative electrode side of the upper switching element 21, and connected to the first terminal 71 via the capacitor 83. The second diode 82 is provided with its forward direction corresponding to the direction from the second terminal 72 toward the first terminal 71. A third terminal 73 of the upper driver circuit 12a is connected to a control terminal (gate terminal) of the upper switching element 21.

Hence, the capacitor 83 is charged by a potential difference between the first terminal 71 and the second terminal 72 during a period for which the lower switching element 22 is controlled so as to be turned on. The potential difference is approximately equal to the potential difference between the reference power line D and the negative power source line N. When the upper switching element 21 is controlled so as to be turned on, the control signal S generated by the control device 10 and input to an input terminal (not illustrated) of the upper driver circuit 12a is output from the third terminal 73 of the upper driver circuit 12a as a gate drive signal having the potential difference between the reference power line D and the negative power source line N. In this event, power is supplied from the charge accumulated in the capacitor 83 to the upper driver circuit 12a.

In this way, in the case where the bootstrap power source 80 which uses a bootstrap circuit is applied as the power source for the driver circuit 12, it is suitable that the control device 10 controls all the lower switching elements 22 so as to be turned on in the short-circuiting processing. This is because the period for which the upper switching elements 21 can be continuously controlled so as to be turned on is constrained by the amount of charge accumulated in the capacitor 83, but there is no such constraint for the lower switching elements 22.

Figure 4:
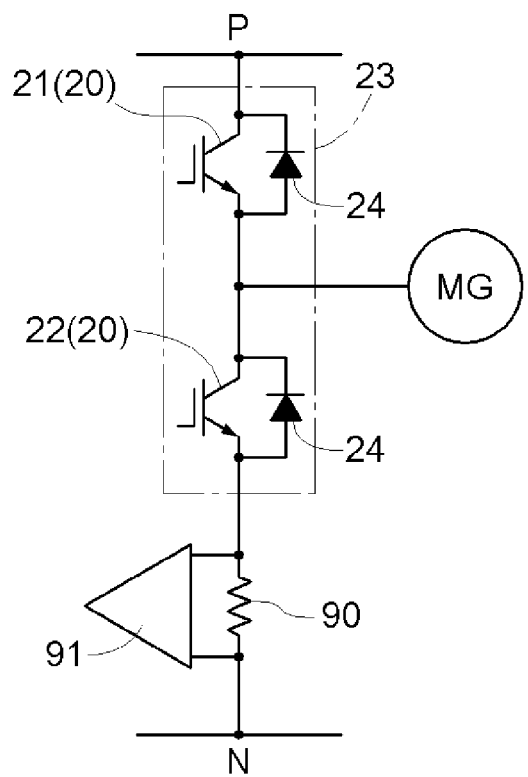
FIG. 4 is a diagram illustrating a part of an inverter according to yet another embodiment of the present disclosure.

(2) In the embodiment described above, the control device 10 is configured to execute current feedback control on the rotary electric machine MG using the current detected by the current sensor 4. However, embodiments of the present disclosure are not limited thereto. For example, as illustrated in FIG. 4, a shunt resistance 90 may be connected in series between the lower switching element 22 and the negative power source line N, and the control device 10 may be configured to execute current feedback control on the rotary electric machine MG using a current detected by the shunt resistance 90. In this case, the current sensor 4 may not be provided. In FIG. 4, for simplification, only the arm 23 corresponding to one phase is illustrated. However, the arms 23 for the other phases are also configured in the same manner.

The voltage across (the voltage between the terminals of) the shunt resistance 90 is determined in accordance with the magnitude of the current that flows through the lower switching element 22. Therefore, the current that flows through the lower switching element 22 can be detected by detecting the voltage across the shunt resistance 90. In the example illustrated in FIG. 4, a computation amplifier 91 that detects the voltage across the shunt resistance 90 is provided, and the control device 10 detects a current that flows through the lower switching element 22 on the basis of an output signal from the computation amplifier 91 and the resistance value of the shunt resistance 90. The shunt resistance 90 may be provided to only the lower switching elements 22 for two phases, among the three phases, and a current that flows through each of the three phases may be detected using the two shunt resistances 90 and utilizing the fact that the sum of instantaneous values of the currents for the respective phases is zero.

Consequently, in a configuration in which the shunt resistance 90 which is configured to detect a current that flows through the lower switching element 22 is connected in series between the lower switching element 22 and the negative power source line N, it is suitable that the control device 10 is configured to control all the lower switching elements 22 so as to be turned on in the short-circuiting processing. This is because the configuration allows detection of a current that flows through the lower switching element 22 during execution of the short-circuiting processing, and therefore enables detection of occurrence of an abnormal state such as a state in which an excessively large current flows through the lower switching element 22.

(3) In the embodiment described above, the control device 10 is configured to execute the short-circuiting processing continuously after the stop position of the rotor of the rotary electric machine MG is detected until rotation of the rotor of the rotary electric machine MG is started. However, embodiments of the present disclosure are not limited thereto. For example, the short-circuiting processing can be executed after the rotor of the rotary electric machine MG is positioned at a known magnetic pole position, and the short-circuiting processing can be executed continuously until rotation of the rotor of the rotary electric machine MG is started. For example, the rotor can be positioned at a known magnetic pole position by applying a DC current to only the stator coil for a particular phase (e.g. U-phase). It is also possible to consider that the stop position of the rotor of the rotary electric machine MG is a known magnetic pole position (that is, the known magnetic pole position is detected as the stop position of the rotor) after a set time elapses after processing for positioning the rotor at the known magnetic pole position is started, and the short-circuiting processing can be executed continuously thereafter until rotation of the rotor of the rotary electric machine MG is started.

(4) In the embodiment described above, a sensor (rotation sensor) that includes a member that rotates together with the rotor of the rotary electric machine MG and that detects the rotational position of the rotor of the rotary electric machine MG is not connected to the control device 10. However, embodiments of the present disclosure are not limited, and the control device 10 can also be configured to be connected to such a rotation sensor. For example, a rotation sensor that has a resolution enough to determine at least the polarity of the magnetic pole position can be connected to the control device 10. In this case, when the magnetic pole position of the rotor is to be detected on the basis of the second detection technique in a state in which the magnetic pole position of the rotor is unknown, a magnetic pole position with a known polarity detected by the rotation sensor can be used as the initial value, which eliminates the need for N/S determination discussed above. As a result, when the magnetic pole position of the rotor is to be detected in a state in which the magnetic pole position of the rotor is unknown (e.g. when the magnetic pole position of the rotor is to be detected on condition that the main power of the control device 10 is turned on), it is possible to shorten the time until detection of the magnetic pole position of the rotor including polarity.

(5) Also regarding other configurations, the embodiments disclosed herein are illustrative in all respects, and the present disclosure is not limited thereto. That is, a configuration not described in the claims of the present disclosure may be modified without departing from the object of the present disclosure.

INDUSTRIAL APPLICABILITY

The present disclosure may be applied to a control device that controls an inverter interposed between a DC power source and an AC rotary electric machine to perform power conversion between DC power and AC power.

The invention claimed is:

1. A control device that controls an inverter interposed between a DC power source and an AC rotary electric machine to perform power conversion between DC power and AC power, wherein
   the inverter includes a plurality of sets of an upper switching element and a lower switching element connected in series with each other between positive and negative electrodes on the DC side and controlled so as to be turned on and off in a complementary manner; and
   the control device executes short-circuiting processing, in which all the upper switching elements or all the lower switching elements are controlled so as to be turned on, while the AC rotary electric machine is stationary after a rotor of the AC rotary electric machine, which has been rotating, is stopped.

2. The control device according to claim 1, wherein
   the short-circuiting processing is executed continuously after a stop position of a rotor of the AC rotary electric machine is detected at a time point when the rotor of the AC rotary electric machine, which has been rotating, is stopped or afterwards until rotation of the rotor of the AC rotary electric machine is started.

3. The control device according to claim 2, wherein
   the stop position of the rotor of the AC rotary electric machine is detected by a detecting method that utilizes a saliency of the rotor of the AC rotary electric machine.

4. The control device according to claim 2, wherein
   all the lower switching elements are controlled so as to be turned on in the short-circuiting processing.

5. The control device according to claim 4, wherein
   the AC rotary electric machine is a drive rotary electric machine for a hydraulic pump that generates a control hydraulic pressure for a vehicle drive transmission device.

6. The control device according to claim 2, wherein
   the AC rotary electric machine is a drive rotary electric machine for a hydraulic pump that generates a control hydraulic pressure for a vehicle drive transmission device.

7. The control device according to claim 1, wherein
   all the lower switching elements are controlled so as to be turned on in the short-circuiting processing.

8. The control device according to claim 7, wherein
   the AC rotary electric machine is a drive rotary electric machine for a hydraulic pump that generates a control hydraulic pressure for a vehicle drive transmission device.

9. The control device according to claim 1, wherein
   the AC rotary electric machine is a drive rotary electric machine for a hydraulic pump that generates a control hydraulic pressure for a vehicle drive transmission device.

* * * * *